United States Patent [19]
Hutson

[11] 3,753,292
[45] Aug. 21, 1973

[54] ADJUSTABLE SALIVA EJECTOR

[75] Inventor: Clifford L. Hutson, Glendale, Calif.

[73] Assignee: Clifford L. Hutson and Anita M. Hutson, Glendale, Calif.

[22] Filed: Apr. 22, 1971

[21] Appl. No.: 136,607

Related U.S. Application Data

[63] Continuation of Ser. No. 850,794, Aug. 18, 1969, abandoned.

[52] U.S. Cl. .................................................. 32/33
[51] Int. Cl. ............................................. A61c 11/00
[58] Field of Search ................ 138/106, 107; 32/33

[56] References Cited
UNITED STATES PATENTS
2,595,666  5/1952  Hutson .................................. 32/33
  453,628  6/1891  Durand ................................. 32/33

Primary Examiner—Robert Peshock
Attorney—Paul A. Weilein

[57] ABSTRACT

A support frame has an elongate open guide channel with a connection base at one end and a restraint loop at the other. The restraint loop has a through passage connecting with the channel. One end of a flexible conduit with a saliva ejector tip passes through the restraint loop into the channel to slidably engage a conduit connector at the connection base. Preferably, the connector has an elongate conduit receiver on which the conduit is slidable. The receiver flexes to facilitate removal of the conduit from the channel to adjust the overlap of the conduit and the connector to change the extension of the ejector tip with respect to the restraint loop. The conduit connector and ejector tip configuration and material may vary.

8 Claims, 7 Drawing Figures

Patented Aug. 21, 1973

INVENTOR
CLIFFORD L. HUTSON
BY
Paul A. Weilein
ATTORNEY

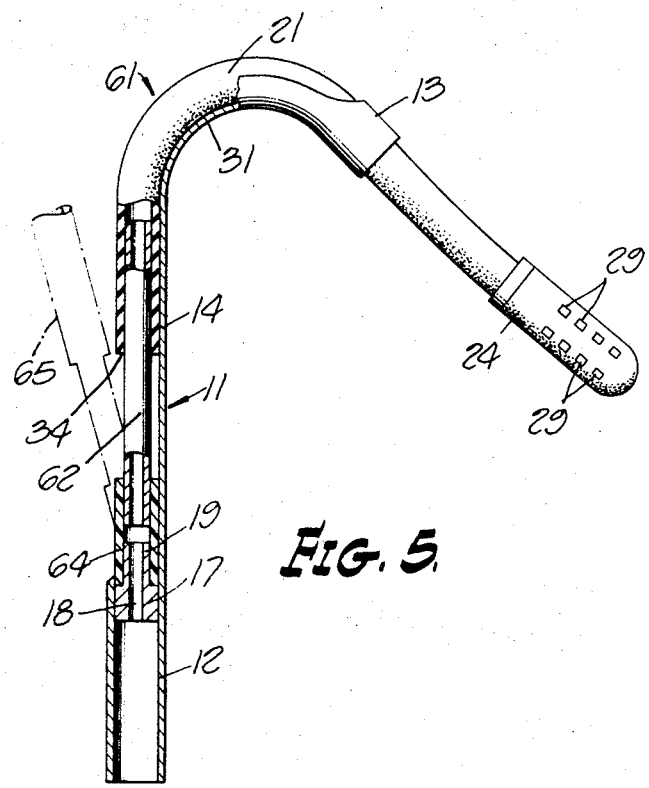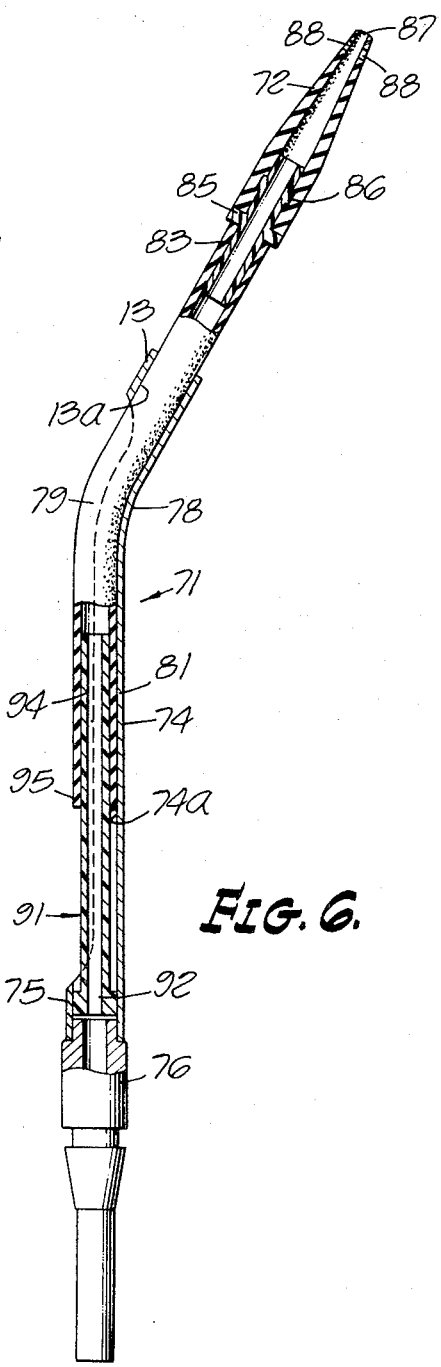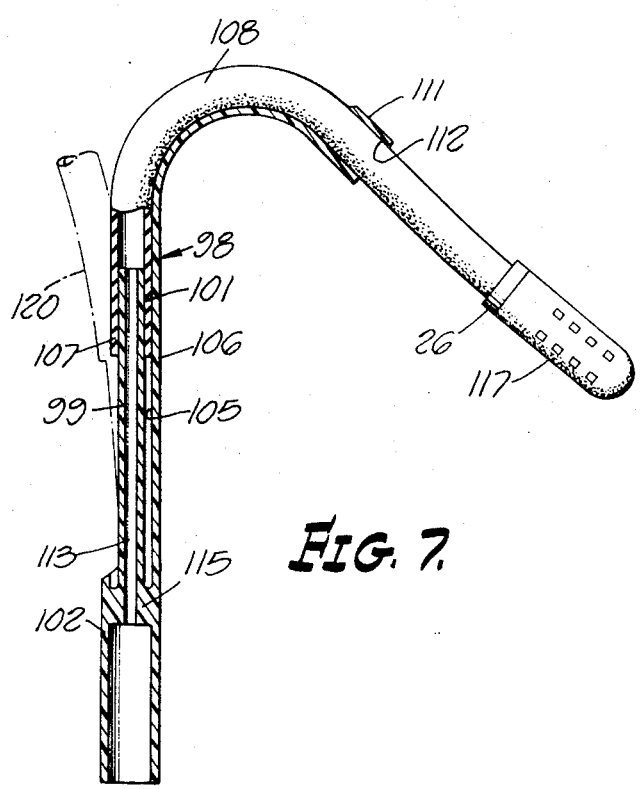

ADJUSTABLE SALIVA EJECTOR

This application is a continuation of Ser. No. 850,794 filed Aug. 18, 1969 and is now abandoned.

BACKGROUND OF THE INVENTION

Dentists and oral surgeons use saliva ejectors for removing liquid and small particulate from the mouth. Liquids such as blood from bleeding gums and water used in drilling and polishing accumulate in the mouth, discomfiting the patient and interfering with the task of the dentist or surgeon. Saliva ejectors are of two types, the one commonly called an "ejector" comprising a U-shaped tube adapted to hook over the patient's lower lip and front teeth with an end in close association with the tissues of the anterior portion of the mouth. In the other saliva ejector used by oral surgeons the outer end portion of the eductor tube is inclined at a small angle and the device is normally positioned manually by an assistant. Both devices have tips or nozzles which admit liquid in response to suction applied to the opposite end of the tube in conventional fashion. Both types of saliva ejectors are shown in my previous U.S. Pat. No. 2,595,666, issued May 6, 1952.

Both devices must be cleaned and sterilized. The orifices involved are relatively small so it is advantageous to have saliva ejectors comprised of components having straight passages. Since the ejectors are normally curved, that conduit portion which is curved is advantageously removable so that it may assume a straight line for cleansing. The materials of the ejector are conventionally such that they may resist the chemicals and/or heat of sterilization.

There is a great variation in the internal dimensions of the oral cavities of patients. Men generally have larger oral cavities than women. A great variation in mouth sizes exists in children. The floor of the mouth varies in depth from person to person. Previous saliva ejectors have had tips fixed in extension with respect to the frame. Therefore, previous devices could not compensate for oral cavity variations.

Recent techniques of dentistry involve disposing the patient in a more reclining position than formerly such that the practitioner may work sitting down. Saliva is thus driven to the posterior portion of the mouth, making desirable extension of the saliva ejector to areas more remote from the front teeth, such extension being outside the capability of prior ejectors.

My invention solves the problem of adapting to varying sizes and attitudes in that the saliva ejector is adjustable with respect to the extension of the ejector tip from the support frame. Such adjustability is uncomplicated and suited to saliva ejectors which have disposable as well as reusable components.

SUMMARY OF THE INVENTION

The invention contemplates a saliva ejector which comprises a support frame which may be of metal or a suitable plastic and includes a connection base at one frame end with an open guide channel extending from the base to a restraint loop at the opposite frame end. The guide channel embraces and supports a length of flexible conduit having an ejector tip. The restraint loop has a through passage which connects with the channel. The channel has a curving portion between the base and the loop, the degree of curvature depending upon whether the ejector is to be used in conventional dentistry or oral surgery. The flexible conduit is adapted to pass through the loop into the channel and be joined to a conduit connector disposed at the connection base. The connector has an internal passageway and an external conduit receiver. The receiver is adapted to engage the conduit in sliding fashion, such that the conduit may be selectively positioned along the conduit receiver to change the extension of the ejector tip with respect to the restraint loop.

The connectors may have various configurations, each adapted to aid in the adjustment of the conduit within the guide channel. The connector may include a flexible link between the connector and a conduit receiver extension. The conduit receivers may vary in length. They may also be of differing materials, depending upon the amount of flexure desired to enable displacement of the receiver from the guide channel in order to facilitate adjustment of the conduit end on the receiver.

In a preferred embodiment of the invention the guide channel is semi-cylindrical in cross section, encompassing more than 180°, such that the flexible conduit is embraced by the channel when the conduit is pressed downwardly into the channel past the slightly converging opposite wall edges of the channel.

It is an object of the invention to provide a saliva ejector frame which receives the tip mounting end of a conduit through a restraint loop at the frame outer end.

It is a further object of the invention to provide an ejector in which the flexible conduit may be selectively joined to the fame such that the extension of the conduit tip from the restraint loop is variable.

It is another object of the invention to provide a saliva ejector in which the means joining the conduit to the frame is resiliently displaceable from the frame to facilitate application and adjustment of the conduit on the joining or connecting means.

BRIEF DESCRIPTION OF THE DRAWINGS

FIG. 5 is an elevation partly in section of a further alternate embodiment of the invention having a flexible connector between the internal passageway and the conduit receiver;

FIG. 6 is an elevation partly in section of an aspirator in accordance with the invention; and FIG. 7 is an elevation partly in section of a further alternate embodiment in which the support frame and the conduit connector are integral.

DESCRIPTION OF THE PREFERRED EMBODIMENTS

Figure 1:
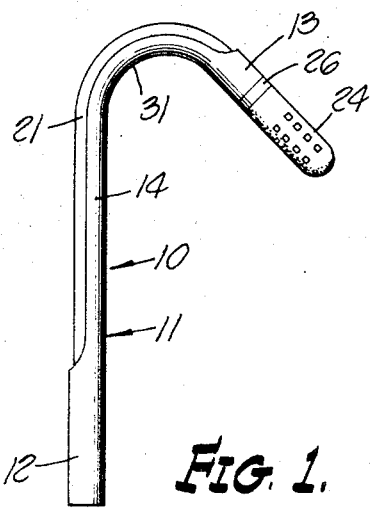
FIG. 1 is an elevation of an embodiment of the saliva ejector of the invention.

In the various views like parts are identified by like reference characters. The particular connectors for the eduction machine to which the ejector of the invention is normally connected are not shown, with the exception of the embodiment of FIG. 6.

Figure 2:
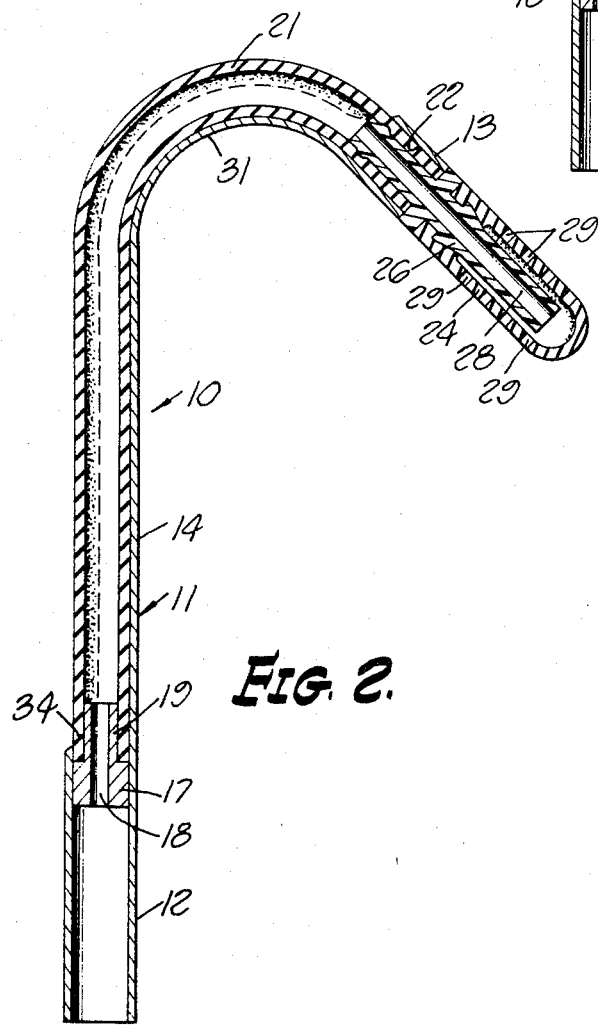
FIG. 2 is an enlarged longitudinal cross section of the embodiment of FIG. 1.

In FIGS. 1 and 2 the saliva ejector 10 of the type conventionally used in dentistry comprises an elongate support frame 11 which has a tubular connection base 12 at one end and a restraint loop 13 at its other end connected by a guide channel 14 which curves adjacent the loop. Preferably, both the connection base and the restraint loop are defined by closed annuli, but the closure need not be complete, for instance if the support frame were made from a patterned piece rolled into the configuration shown in the descriptive figures.

A conduit connector 17 is located in the upper end of base 12. The connector comprises an inner passageway 18 and a reduced diameter conduit receiver portion 19. The receiver portion extends into the guide channel. A flexible conduit 21 connected with the receiver portion 19 is carried along the guide channel and extends through a passage 22 defined by the restraint loop. A saliva ejector tip 24 is connected to the flexible conduit by a joint 26 having a straight bore 28. Preferably, the tip is made of a resilient material such as rubber and has a plurality of openings 29 through which liquid flow is educed when the tip is in the patient's mouth.

The saliva ejector 10 is for normal dental use and therefore a curved portion 31 of the guide channel defines a configuration adapted to hang over the lower tip and front teeth of a patient.

Connection base 12 accepts connecting fittings (not shown) adapted for attachment to various conventional suction devices.

The device of FIGS. 1 and 2 is assembled by passing an end 34 of flexible conduit 21 through passage 22 in restraint loop 13 and curving the conduit generally along guide channel 14 and slipping end 34 of the conduit around conduit receiver 19. The fit, while a slip fit, is of sufficient tightness to maintain the conduit over the receiver and seal against leakage during suction operation. While ejector tip 24 has been shown as a separable part of the flexible conduit, the ejector tip may be defined by an extension of the conduit beyond loop 13, said extension having a plurality of perforations through the extending wall.

Since the flexible conduit and the tip as a unit so readily assemble with the support frame, it is possible to utilize disposable conduit and tip units which need not thereafter be sterilized. No curving closed passageways then remain to inhibit thorough cleansing.

Figure 3:
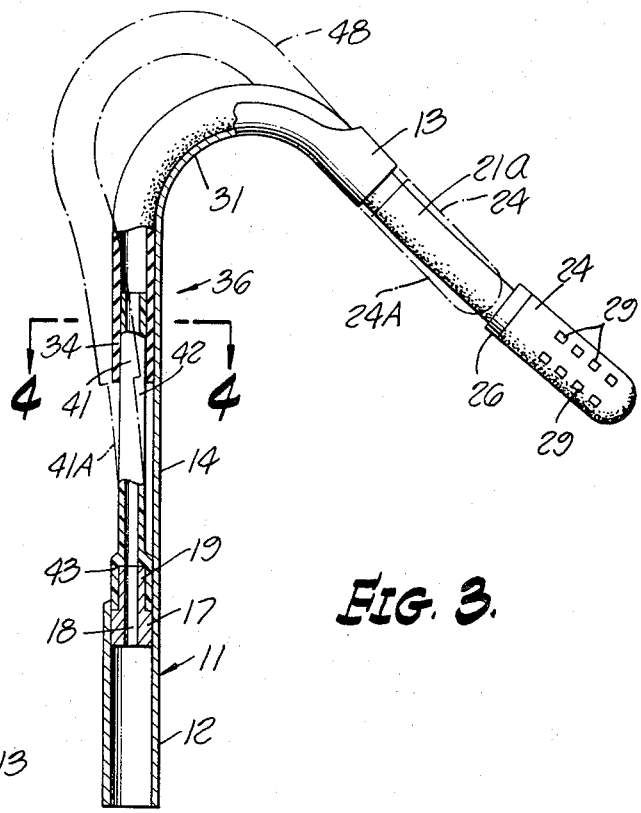
FIG. 3 is an elevation partly in section of an alternate embodiment of the invention.
Figure 4:
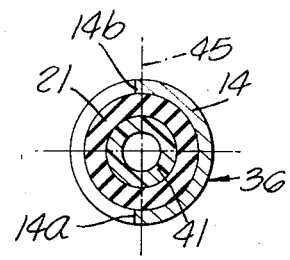
FIG. 4 is a transverse section taken along line 4—4 of FIG. 3.

In FIGS. 3 and 4, a saliva ejector 36 of the type commonly used in dental work comprises a support frame 11 having a tubular connection base 12 at one end and a restraint loop 13 at the other end connected by a rigid guide channel 14. A curved frame portion 31 enables the ejector to hang on the lip and front teeth of a patient. A flexible conduit 21a having a removable ejector tip 24 extends from the tip through the passageway of the restraint loop 13 into the guide channel of the support frame 11. The conduit lodges in the guide channel as it extends along curved portion 31 to juncture with a conduit receiver extension 41. Preferably the receiver extension is of a resilient material capable of flexure. The conduit slips about a cylindrical surface 42 of the receiver extension. The extension has an enlarged cylindrical portion 43 which slidingly connects to receiver 19 of conduit connector 17 seated in tubular connection base 12 of the saliva ejector.

The conduit and the ejector tip extend from the restraint loop 13 beyond the position of the tip shown in FIGS. 1 and 2. Such extension is desired under some conditions, as when the mouth of a patient has a deep floor or as when a patient is in a more reclining position wherein liquids flow to the posterior portion of the mouth floor.

In FIG. 4 guide channel 14 is shown in cross section to extend a short distance arcuately beyond a diametral line 45. The guide channel thus has longitudinal edges 14a, 14b whose connecting chord is shorter than the diameter of the relaxed flexible conduit. The conduit may therefore be lodged in the channel securely because the channel embraces more than 180° of the conduit surface. The conduit is not held so securely that it cannot be removed from the channel into the phantom line position 48 of FIG. 3, such that the end 34 of the conduit may then be slidably adjusted along conduit receiver 41 while the conduit is unrestrained by the channel.

As in the previously described embodiment, the device of FIG. 3 adjusts extension of the tip beyond the loop 13. To meet varying oral conditions the extension of tip 24 beyond the loop 13 may be readily adjusted by removing the conduit from the guide channel sufficiently to flex receiver 41 and reposition the end 34 of the conduit along the receiver extension 41.

An alternate embodiment of the invention is disclosed in FIG. 5 wherein a saliva ejector 61 comprises a support frame 11 substantially similar to that of the previously described embodiments. The support frame has a tubular connection base 12 at one end from which extends an open guide channel 14 which has a curving portion 31 terminating in a restraint loop 13 at the other end of the frame. The curve is such that the ejector may be suspended on the lower lip and front teeth of a user.

The connector base 12 receives a conduit connector 17 which has an inner passageway 18 and a conduit receiver portion 19. A tubular conduit receiver extension 62, which may be of a suitable rigid metallic or plastic material, is joined to the conduit receiver portion by a flexible sleeve 64 which is in sealing slidable relationship to both the conduit receiver portion and the conduit receiver extension. A flexible conduit 21 has an end 34 which is in slidable sealing relationship with the conduit receiver extension 62. The flexible conduit passes through the passageway defined by restraint loop 13 and is fitted over the receiver extension 62 when the extension is displaced outwardly from the guide channel 14 as shown in the phantom line position 65. The receiver extension is displaceable because of the flexibility of joining sleeve 64.

The saliva ejector tip 24, secured to the outer end of conduit 21, may be adjusted with respect to the restraint loop 13 by displacing conduit 21 from guide channel 14 and adjusting the position of end 34 along conduit extension 62 when that extension is flexed away from the channel. Thus, tip 24 may be varied in its extension beyond loop 13 to accommodate the varying conditions both of the patient position and the oral cavity configuration.

FIG. 6 illustrates an alternate embodiment of the invention comprising a saliva ejector 71. The configuration of ejector 71 dictates its use as a hand held aspirator most useful in oral surgery where the ejector is manually held within the mouth of the patient such that its tip 72 may be directed to various localized conditions not within the effective range of a aliva ejector suspended from the lower lip and teeth. Ejector 71 embodies a support frame 74 including a tubular connection base 75 into which an adapter 76 fits to accommodate the nominally seven-sixteenths inch diameter suction hose (not shown) used with aspirators.

The frame 74 has a curving portion 78 which terminates remote from the tubular base in a restraint loop 13. The restraint loop has a through passageway 13a through which a flexible conduit 79 extends into a guide channel 81 of the support frame. The guide channel may have a cross sectional configuration similar to that of channel 14 of FIG. 4, which embraces the conduit guided along its extent.

The tip 72 is secured to an end 83 of the flexible conduit by a connector 85 which has an annular bead 86 which restrains tip 72 on the connector. Preferably, the tip is of a relatively soft material which restricts about the bead for a mechanical lock. The tip may have a single terminal opening 87 or may be provided with added radial openings 88 displaced from the tip terminal.

A connector base 75 receives a conduit connector 91 which has an inner passage 92 and a cylindrical conduit receiver 94 of considerable axial extent. Preferably, the receiver is of a plastic capable of sterilization and with a small degree of flexibility so that the connector may be flexed from an inner wall 74a of the guide channel in the manner described with respect to the embodiment of FIG. 3 to facilitate adjustment of the flexible conduit on the receiver and thus alter the extension of the conduit and tip beyond restraint loop 13.

FIG. 6 illustrates the tip as being displaced from the restraint loop 13. Under certain conditions of use it may be desirable to abut the connector 85 with the restraint loop, in which case the flexible conduit 79 is slidably displaced so that its end 95 approaches connection base 75 along the conduit connector 91.

FIG. 7 illustrates an embodiment of the invention in which a support frame 98 and a conduit connector 99 are integrally formed. Such a device may be injection molded from a suitable plastic material that resists the effects of sterilization. The plastic should be such that a conduit receiver 101, which extends from a tubular base 102 of the support frame 98 has resiliency sufficient to be displaced from an inner wall 105 of a guide channel 106 sufficiently to expedite adjustment of an end 107 of a flexible conduit 108 along the receiver 101.

The guide channel 106 extends from the tubular base 102 to a restraint loop 111 having a through passageway 112 connecting with the guide channel. Flexible conduit 108 extends through the passage into the guide channel and is slidably engaged with conduit receiver 101. The conduit receiver has an inner passageway 113 which extends through a thickened wall portion 115 at the tubular base and extends upwardly through the conduit receiver 101.

The conduit 108 terminates in a saliva ejector tip 117 which may be connected to the flexible conduit by a rigid connector 26 similar to the connector described with respect to the embodiments of FIGS. 1 and 3.

Like the previously described embodiments the conduit and tip unit may be adjustably oriented with respect to the support frame such that the ejector tip 117 is advantageously located within the oral cavity of the patient. The conduit receiver 101, being flexible, readily adapts to a phantom position 120 displaced from the inner wall 105 of the guide channel such that the position of the conduit on the receiver may be slidably altered to reposition the tip 117 with respect to the restraint loop 111.

In each of the illustrative embodiments the flexible conduit and tip unit may be "loaded" into the support frame through the restraint loop with facility. Each embodiment has a conduit connector to which the end of the flexible conduit may be readily joined. The connector establishes full suction continuity through the conduit and the support frame. The guide channel embraces the conduit within the support frame and, together with the restraint loop, maintains the conduit and its tip in the desired attitude. The restraint loop also acts to limit the movement of the conduit toward the connector in those instances in which the saliva ejector tip exceeds the passageway in the loop in diameter.

The apparatus of the invention lends itself to quick disassembly for the purposes of cleaning. The components have straight passageways which receive cleaning instruments readily, including the flexible conduit which, of course, can assume a linear attitude for cleaning. The tip may be removable so that both ends of the flexible conduit are accessible.

I claim:

1. In a saliva ejector: an elongate support frame having a curved portion at one end adapted to be placed in an oral cavity, said frame being formed with a longitudinal channel extending between end portions of the frame, said channel being open along one side including an outer peripheral side of said curved portion so as to laterally receive a flexible conduit through the open side into a seated position in the channel, a connection base at the other end of the frame comprising a tubular portion establishing a telescopic flow connection, with the adjacent end portion of said flexible conduit, means at said one end of the support frame for embracing the opposite end portion of said conduit and enabling adjusting movements of the conduit therein, said conduit being of a length to provide, when seated in said channel, a portion at said opposite end of said conduit extending beyond the embracing means so as to position an ejector tip thereon, outwardly of said embracing means, and enable adjusting movements to vary its operative position in accordance with said conduit adjusting movements, and upon movement of the tip towards the embracing means enabling distortion of the conduit outwardly away from its seated position through the open side of the channel, and cooperating stop means on said embracing means and said ejector tip to limit movement of said ejector tip toward the embracing means.

2. A saliva ejector in accordance with claim 1 wherein said embracing means comprises a loop extending loosely around the flexible conduit.

3. A saliva ejector in accordance with claim 1 wherein said connection base comprises a cylindrical element secured to the frame, a conduit receiver extending from the cylindrical element, an internal passageway through the element and the receiver, and a cylindrical outer surface on the conduit receiver.

4. A saliva ejector in accordance with claim 1 wherein said connection base comprises a connector element secured in the frame, a flexible sleeve fitted to the connector element, and an elongate conduit receiver fitted to the sleeve.

5. A saliva ejector in accordance with claim 1 wherein said connection base comprises a connector element secured in the frame, and an elongate conduit receiver extending from the connector element, said receiver being flexibly laterally deflectable relative to the said support frame.

6. A saliva ejector in accordance with claim 1, wherein said connection base comprises a connector element at said base, and an elongate flexible conduit receiver extending from said connector element, said connector element and said receiver having a slip joint connection.

7. A saliva ejector in accordance with claim 1, wherein said tubular portion comprises an elongate conduit receiver integrally formed with said frame.

8. In a saliva ejector: an elongate support frame having a curved portion at one end adapted to be placed in an oral cavity, said frame being formed with a longitudinal side open channel extending between end portions of the frame for embracing and supporting an associated flexible conduit therein, a connection base at the other end of the frame comprising a tubular portion for establishing a telescopic flow connection with the adjacent end portion of the associated flexible conduit, and means at said one end of the support frame for peripherally and slidably embracing the opposite end portion of said conduit and enabling axial adjusting movements of the conduit therethrough, said conduit being of a length to provide a portion at said opposite end of said conduit extending beyond the embracing means so as to normally position an ejector tip thereon outwardly of said embracing means and for adjustable movement inwardly towards said embracing means, and cooperating stop means on said embracing means and said ejector tip to limit movement of said ejector tip toward the embracing means.

* * * * *